4 Sheets--Sheet 1.
CHARLOTTE L. SLADE.
Doll Clothes Patterns.
No. 156,382.                                Patented Oct, 27, 1874.
FIG.1.   FIG.2.   FIG.4.   FIG.3.
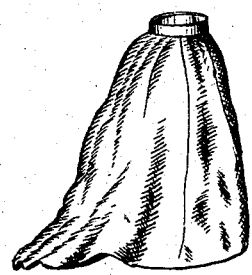   
FIG.5.   FIG.6.   FIG.7.
  
FIG.8.   FIG.9.   FIG.10.
  
FIG.11.   FIG.12.   FIG.13.
  
WITNESSES                                INVENTOR
Jas L. Ewin                              Charlotte L. Slade
Henry Tanner.                            By Knight Bros Attorneys

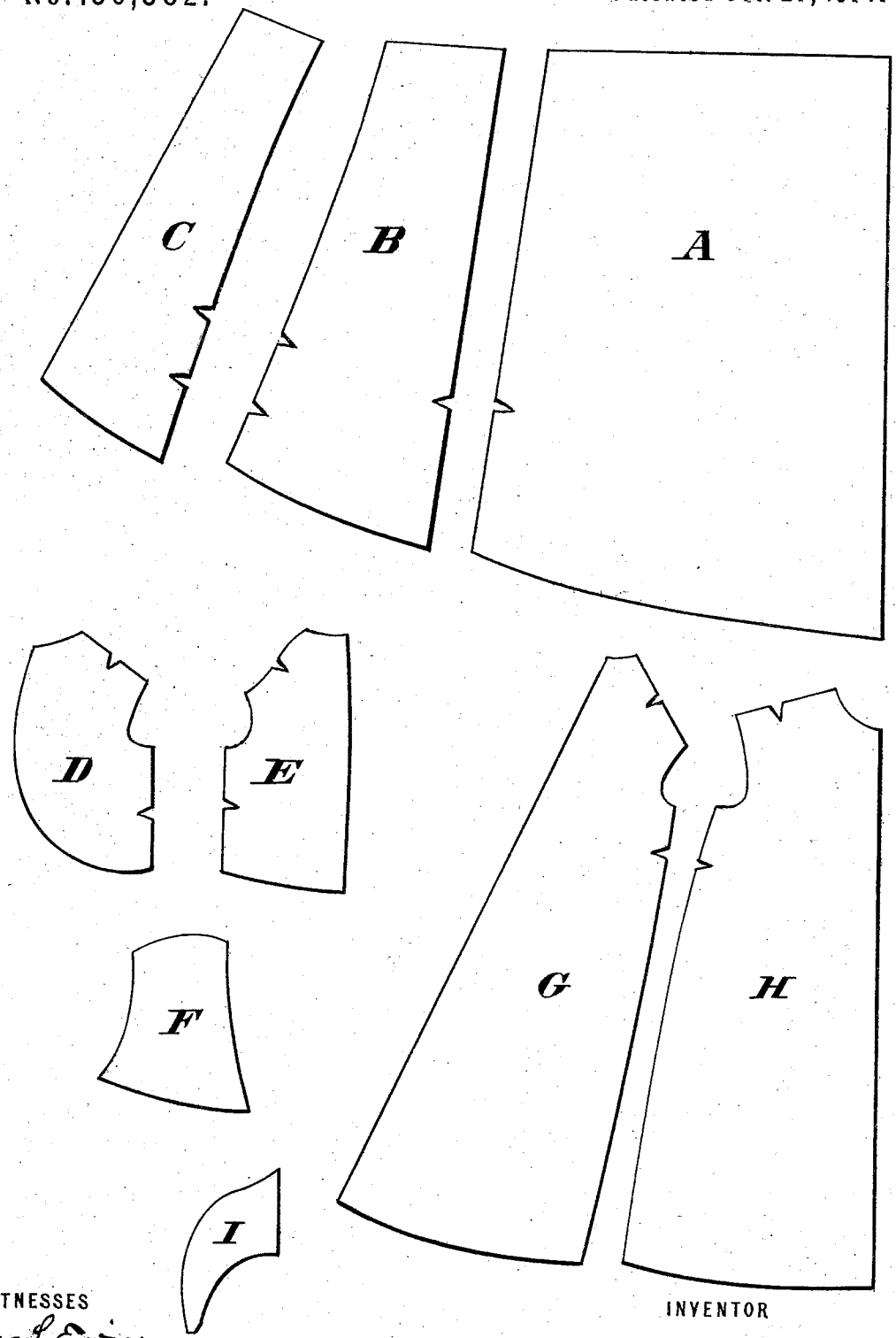

4 Sheets—Sheet 3.
CHARLOTTE L. SLADE.
Doll Clothes Patterns.
No. 156,382. Patented Oct. 27, 1874.
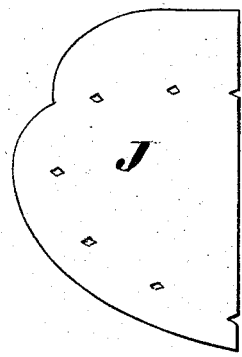
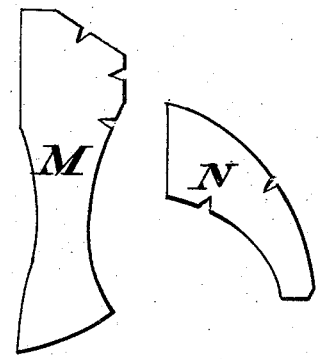
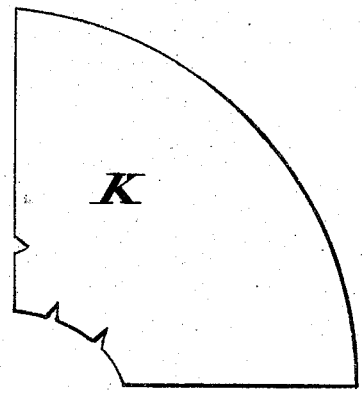
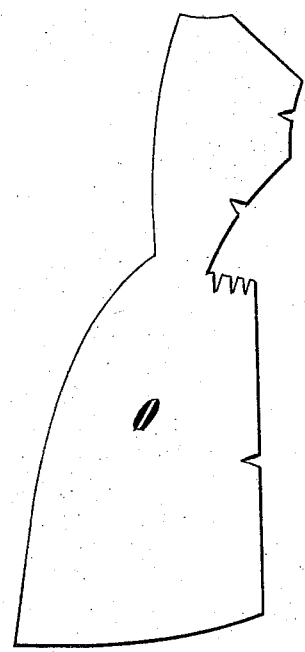
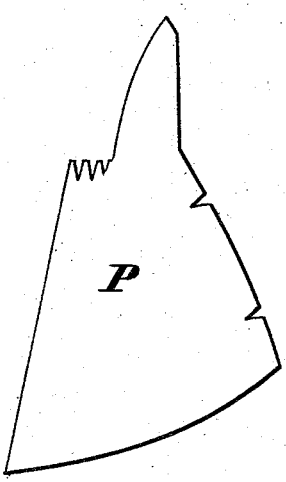
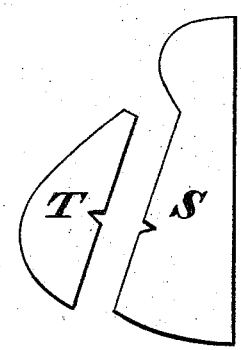
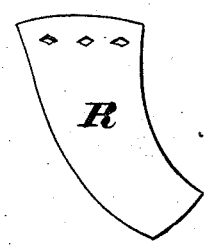
WITNESSES
Jas. L. Ewin
Henry Tanner
INVENTOR
Charlotte L. Slade
By Knight Bros. Attorneys
THE GRAPHIC CO. PHOTO-LITH. 39 & 41 PARK PLACE, N.Y.

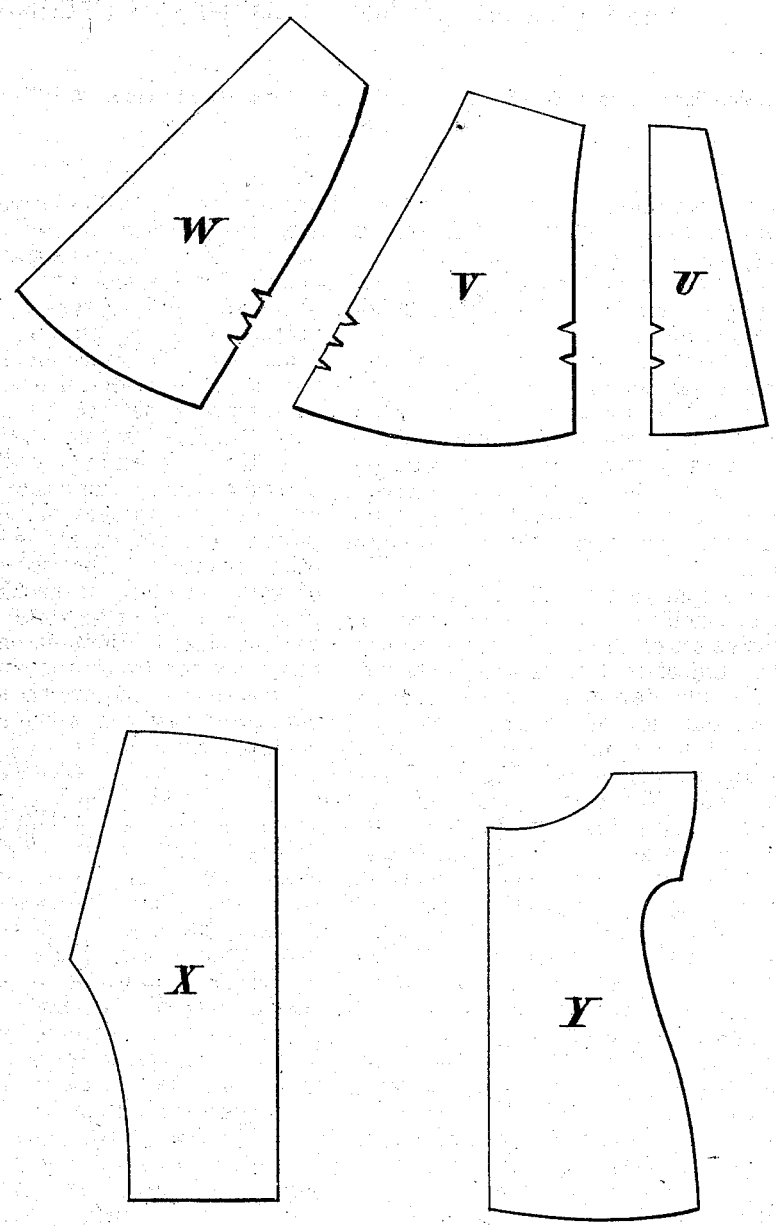

UNITED STATES PATENT OFFICE.

CHARLOTTE L. SLADE, OF NEW YORK, N. Y.

IMPROVEMENT IN DOLL-CLOTHES PATTERNS.

Specification forming part of Letters Patent No. 156,382, dated October 27, 1874; application filed July 11, 1874.

*To all whom it may concern:*

Be it known that I, CHARLOTTE L. SLADE, of the city, county, and State of New York, have invented a new and useful Improvement in Patterns of Dolls' Clothes, of which the following is a specification:

This invention relates to that class of toys for children which combine amusement or entertainment and instruction. The invention consists in a set of miniature garment-patterns for dolls' clothes, adapted for use by children, and to produce in the aggregate a trousseau or wardrobe, or two or more articles of the prevailing or any preferred style, as hereinafter set forth.

In the accompanying drawing, Sheet 1 represents a lady-doll's trousseau as produced by an illustrative set of the patterns, which constitute the subject-matter of this invention. Figure 1 is a side view of a skirt for a dress. Fig. 2 is a front view of a sacque. Fig. 3 is a front view of a wrapper. Fig. 4 is a front view of a water-proof cloak. Fig. 5 is a side view of a hood. Fig. 6 is a front view of a Russian cloak. Fig. 7 is a back view of the same. Fig. 8 is a front view of a polonaise. Fig. 9 is a side view of a sleeve. Fig. 10 is a side view of an apron. Fig. 11 is a side view of an over-skirt or under-skirt. Fig. 12 is a front view of a pair of drawers. Fig. 13 is a front view of a chemise. Sheets 2, 3, and 4 illustrate by diagrams or plans the set of half-patterns, hereinafter specified.

Referring to Sheet 2, A B C represent the parts of a half-pattern for the skirt or dress, Fig. 1, Sheet 1. D represents the front, E the back, and F the sleeve-pattern, of the sacque, Fig. 2, and of the Russian cloak, Figs. 6 and 7, excepting the cape of the latter. G represents the front and H the back pattern of the wrapper, Fig. 3, or a sacque night-dress, according to the length and material used. I represents the collar-pattern, making, with the patterns G H, the water-proof, Fig. 4, excepting its cape. Referring to Sheet 3, J represents a half-pattern of the hood, Fig. 5. K represents a half-pattern of a talma, which also forms the cape of the water-proof, Fig. 4, and, with the sacque-patterns D E F, cut of proper length, forms the Russian cloak, Figs. 6 and 7. L M represent the parts of a half-pattern of a postilion-waist. O P Q represent the parts of a half-pattern of a polonaise, Fig. 8. R represents a half-pattern of a sleeve, Fig. 9, which serves for all the sleeved garments. S T represent the parts of a half-pattern of an apron, Fig. 10. Referring to Sheet 4, U V W represent the parts of a half-pattern of an under or over skirt, Fig. 11. X represents a pattern for a pair of drawers, Fig. 12. Y represents a pattern for a chemise, Fig. 13. The parts of patterns are notched correspondingly where they are to go together, and grouped notches or perforations are employed to indicate plaiting or gathering, as in other patterns. The patterns may be made of any prevailing or preferred style, and of tissue-paper or other suitable material, and of various sizes in different packages. The patterns in a set are of one and the same scale or size, so as to require no adaptation, and the respective patterns, which might otherwise be confused, are unmistakably distinguished from each other. This has been accomplished by the use of distinguishing-colors, all the parts of one pattern being made alike in color, and different from others of similar or doubtful shape. Thus the patterns in the illustration have been made in colors as follows: The dress-pattern A B C, the natural color of brown tissue-paper; the sacque-pattern D E F, red; the waterproof-pattern G H I, white; the hood-hattern J, blue; the talma-pattern H, purple; the postilion-pattern L M N, light brown; the polonaise-pattern O P Q, light green; the sleeve-pattern R, light brown; the apron-pattern S T, pink; the pattern U V W for under and over skirts, dark green; the drawers-pattern X, yellow; and the chemise-pattern Y, dark brown or chocolate. It is proposed to use printed distinguishing marks or names in lieu of or in addition to the colors. The set of patterns is thus adapted to be packed, sold, and kept in a single envelope or box, which may be of any preferred style. An ordinary paper envelope of convenient size, having printed on its face a brief description of the contents, giving the size of doll for which the patterns are designed, &c., has been employed. A card of directions may be introduced with the patterns to give any explanation which may be necessary, such as the use of certain patterns which are intended or adapted to form different articles; or such directions may be printed on the patterns or on the envelopes.

The following is claimed as my invention, namely:

As a new article of manufacture or toy for children's use, the wardrobe or trousseau for dolls herein described, consisting essentially of a set or package of miniature patterns of ordinary articles of wearing apparel, or of preferred forms, constructed and adapted for use substantially as specified, for the purpose set forth.

CHARLOTTE L. SLADE.

Witnesses:
CLARK M. HAMILTON,
FRANK W. SLADE.